(12) United States Patent
Math et al.

(10) Patent No.: US 10,979,295 B2
(45) Date of Patent: Apr. 13, 2021

(54) AUTOMATICALLY DISCOVERING TOPOLOGY OF AN INFORMATION TECHNOLOGY (IT) INFRASTRUCTURE

(71) Applicant: MICRO FOCUS LLC, Santa Clara, CA (US)

(72) Inventors: Shiva Prakash Suragi Math, Bangalore (IN); Venkatesh Raman Ramteke, Bangalore (IN); Krishna Mahadevan Ramakrishnan, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 956 days.

(21) Appl. No.: 15/113,436

(22) PCT Filed: Jan. 21, 2014

(86) PCT No.: PCT/US2014/012250
§ 371 (c)(1),
(2) Date: Jul. 21, 2016

(87) PCT Pub. No.: WO2015/112112
PCT Pub. Date: Jul. 30, 2015

(65) Prior Publication Data
US 2017/0012818 A1 Jan. 12, 2017

(51) Int. Cl.
*H04L 12/24* (2006.01)
*G06F 16/84* (2019.01)
*G06F 40/205* (2020.01)

(52) U.S. Cl.
CPC ............ *H04L 41/085* (2013.01); *G06F 16/86* (2019.01); *G06F 40/205* (2020.01); *H04L 41/065* (2013.01); *H04L 41/12* (2013.01)

(58) Field of Classification Search
USPC .................................................. 709/220–224
See application file for complete search history.

(56) References Cited

U.S. PATENT DOCUMENTS

2004/0059812 A1 3/2004 Assa
2006/0037000 A1* 2/2006 Speeter ................. H04L 67/125
717/120

(Continued)

FOREIGN PATENT DOCUMENTS

WO PCT-WO2012/138319 10/2012

OTHER PUBLICATIONS

"ITIL Configuration Management Database", ManageEngine ServiceDesk Plus, Zoho Corporation Pvt. Ltd., 2014.

(Continued)

*Primary Examiner* — Younes Naji
*Assistant Examiner* — Da T Ton

(57) ABSTRACT

Provided is a method of automatically discovering topology of an information technology (IT) infrastructure. Topology relationships amongst configuration items (CI) present in a semi-structured data generated by an information technology component of the IT infrastructure are determined. Topology relationships amongst configuration items (CI) present in a structured data generated by the information technology component of the IT infrastructure are determined. The topology relationships amongst the configuration items (CI) present in the semi-structured data are reconciled with the topology relationships amongst the configuration items (CI) present in the structured data.

19 Claims, 3 Drawing Sheets

(56) References Cited

U.S. PATENT DOCUMENTS

| | | | |
|---|---|---|---|
| 2007/0115967 A1 | 5/2007 | Vandenberghe et al. | |
| 2008/0114874 A1 | 5/2008 | Meir et al. | |
| 2008/0235611 A1 | 9/2008 | Fraley et al. | |
| 2008/0263084 A1* | 10/2008 | Faihe | G06Q 10/06 |
| 2009/0187595 A1* | 7/2009 | Akiyama | G06F 9/44505 |
| 2009/0313219 A1* | 12/2009 | Gupta | G06Q 10/10 |
| 2011/0029479 A1* | 2/2011 | Novak | G06F 16/275 |
| | | | 707/610 |
| 2011/0161333 A1 | 6/2011 | Langseth et al. | |
| 2011/0307412 A1* | 12/2011 | Rolia | G06Q 10/06 |
| | | | 705/348 |
| 2011/0320228 A1 | 12/2011 | Kowalski | |
| 2012/0239672 A1* | 9/2012 | Kitajima | H04L 41/085 |
| | | | 707/758 |
| 2012/0296943 A1* | 11/2012 | Nagakura | G06F 16/256 |
| | | | 707/812 |
| 2013/0080624 A1 | 3/2013 | Nagai et al. | |
| 2013/0097183 A1 | 4/2013 | McCracken | |
| 2014/0046877 A1* | 2/2014 | Gopalakrishnan | |
| | | | G06F 16/2465 |
| | | | 706/12 |

OTHER PUBLICATIONS

"OWL 2 Web Ontology Language, Primer" (Second Edition), W3C, Dec. 11, 2012.

Korean Intellectual Property Office, International Search Report and Written Opinion, dated Oct. 30, 2014, 9 pages, Daejeon Metropolitan City, Republic of Korea.

* cited by examiner

AUTOMATICALLY DISCOVERING TOPOLOGY OF AN INFORMATION TECHNOLOGY (IT) INFRASTRUCTURE

BACKGROUND

Information technology (IT) infrastructures of organizations have grown in complexity over the last few decades. Innovative technologies such as virtualization and cloud computing have added new kinds of IT resources (for example, virtual machines) to many existent IT infrastructures comprising of software and hardware resources. Needless to say, it has become quite a challenge for IT personnel to monitor, manage and control problems in the new environment, and to ensure that system performance and availability of resources is not compromised with the growth in the infrastructure.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
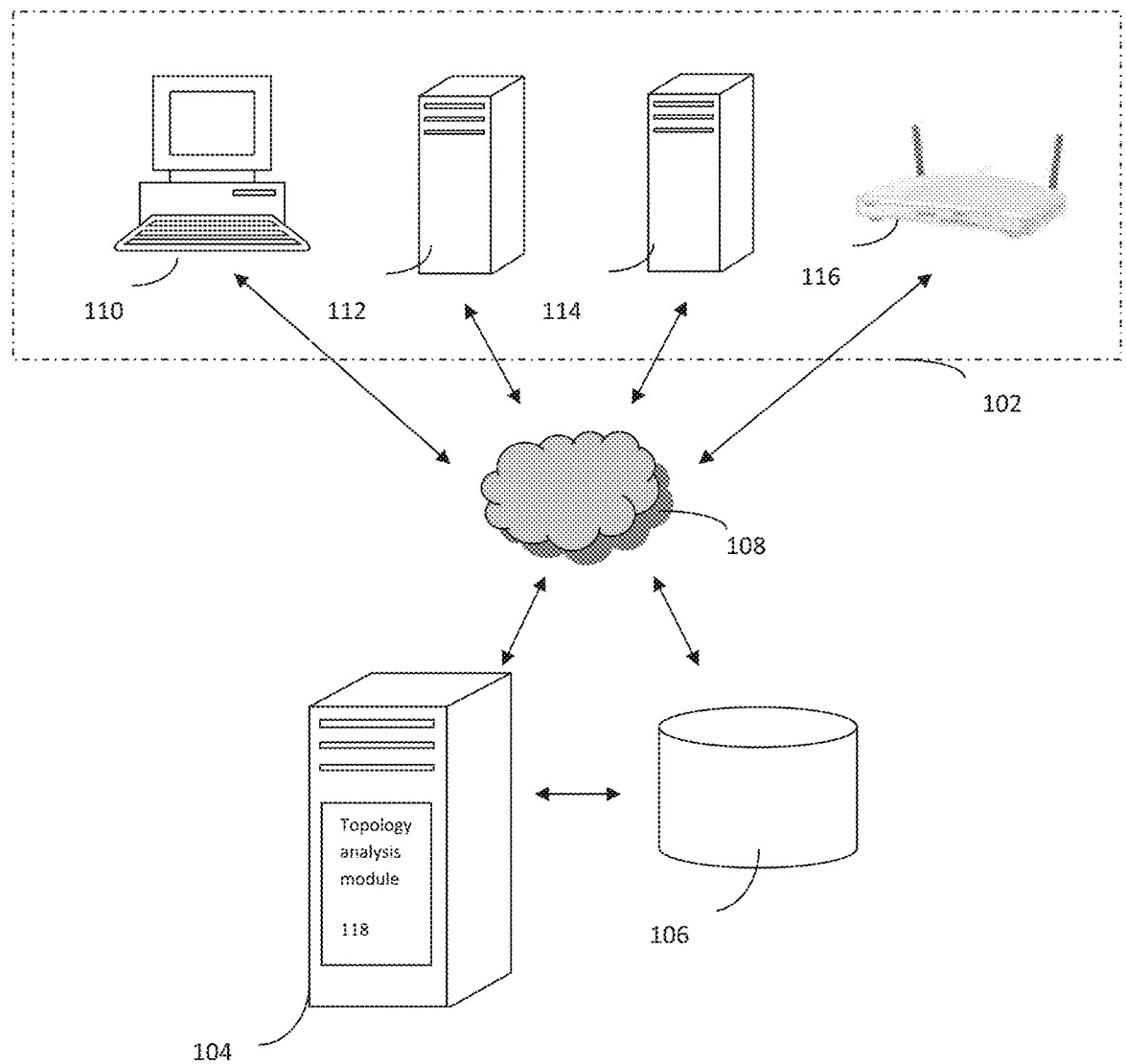
FIG. 1 illustrates a system for automatically discovering topology of an Information Technology (IT) infrastructure, according to an example.

Information technology (IT) infrastructures of organizations have grown in diversity and complexity over the years due to developments in technology. With the advent of new technologies such as Wi-Fi, Virtual Private Networks (VPN), cloud computing, virtualization, etc. and increased adoption of newer forms of computing devices such as smart phones, tablets, wearable devices, etc., it has become quite a task for the information technology management personnel to monitor system performance, ensure availability of applications, manage Service Level Agreements (SLAs), and so forth. Needless to say, there's an increased expectation of a quick resolution of problems, errors, system failures, etc. so that there's least Mean Time To Repair (MTTR).

Typically, a log file generated by a computer system is a good source of information for identifying a system-related problem. However, quite often it is required to look at multiple types of data sources such as metrics, logs, events etc. of all related configuration items (CIs) to identify the root cause for a problem, for instance of a typical multi-tiered application. In such case, topology data is used for identifying related configuration items in an information technology (IT) infrastructure. The topology information may be obtained manually or from a source like a Configuration Management Database (CMDB). In either scenario, the topology information may either be incomplete or outdated since a configuration item discovery module may synchronize configuration items of a specific domain or the domain itself may be too dynamic to keep abreast with the changes (for instance, in case of virtualization). Data sources such as log files, events, configuration files etc. may contain information about the relationship with the dependent CIs that existed when the event occurred. However, a manual analysis of a large number of logs, events, etc, to understand the relationship among CI can be a challenging and difficult task for a user.

Proposed is a method of automatically discovering topology of an information technology (IT) infrastructure. Proposed solution automatically discovers a model and topology relationship between configuration items (CIs) in an information technology (IT) infrastructure by analyzing available data such as log, events, metrics etc. The proposed solution determines topology relationships amongst configuration items (CI) present in semi-structured data and structured data generated by information technology components of the IT infrastructure separately and then reconcile both topologies to determine the topology of the IT infrastructure. Proposed solution enables identification of related topology information for a configuration item that can be used in various scenarios such as providing full context of the issue by giving the context of affected CI and related CIs in the absence of topology source (such as a CMDB) or any manual inputs thereby helping in a quick resolution of a problem and reducing MTTR, to enrich topology information if it already exists in any IT Management software and so on.

The term "information technology (IT) infrastructure" may be defined as a combined set of hardware, software, networks, facilities, etc. in order to develop, test, deliver, monitor, control or support IT services. An IT infrastructure may include hardware component, software components, network components, database components and/or other components.

FIG. 1 illustrates a system 100 for automatically discovering topology of an Information Technology (IT) infrastructure, according to an example. System 100 includes an Information technology (IT) infrastructure 102, computer system 104, and database 106. Various components of system 100 i.e. Information technology (IT) infrastructure 102, computer system 104, and database 106 could be operationally connected over computer network 108. Computer network 108 may be a physical or wireless network. Further, computer network 108 may be a public network such as the Internet, or a private network such as an intranet.

Information Technology (IT) infrastructure 102 includes information technology components 110, 112, 114, and 116. The number of information technology (IT) components shown as part of the IT infrastructure 102 in FIG. 1 is for the purpose of illustration only and these may vary in other implementations. Information technology components that are required to be managed could be termed as Configuration Items (CIs). A configuration item (CI) may include, for example, servers, computer systems, computer applications, routers, buildings, people, formal documentation, etc. A CI could be related to another or multiple CIs. A configuration item could be a component of an IT infrastructure (for example, information technology components 110, 112, 114, and 116) or an item associated with an information technology component. Considering that an IT environment can be very large, potentially containing thousands of CIs, the CIs and relationships together represent a model of the components of an IT environment in which a business functions.

Computer system 104 may be, for example, a computer server, desktop computer, notebook computer, tablet computer, mobile phone, personal digital assistant (PDA), or the like. Computer system 104 may include a processor for executing machine readable instructions and a memory (storage medium) for storing machine readable instructions. Computer system 104 includes a topology analysis module

118. In an implementation, topology analysis module 118 identifies configuration items (CIs) in the Information Technology (IT) infrastructure 102 from the semi-structured data generated by information technology components 110, 112, 114, and 116. Some non-limiting examples of the semi-structured data may include log files, events, configuration files, etc. Topology analysis module 118 may also determine the topology relationships between the configuration items identified in the semi-structured data. In an example, topology analysis module 118 determines the configuration items present in the structured data generated by information technology components 110, 112, 114, and 116 and the topology relationships amongst the identified configuration items. The topology relationships between configuration items identified in semi-structured and/or structured data are stored in database 106. In an example, the database 106 is an ontology-based database. In an implementation, computer system 104 and database 106 are part of the Information Technology (IT) infrastructure 102.

Figure 2:
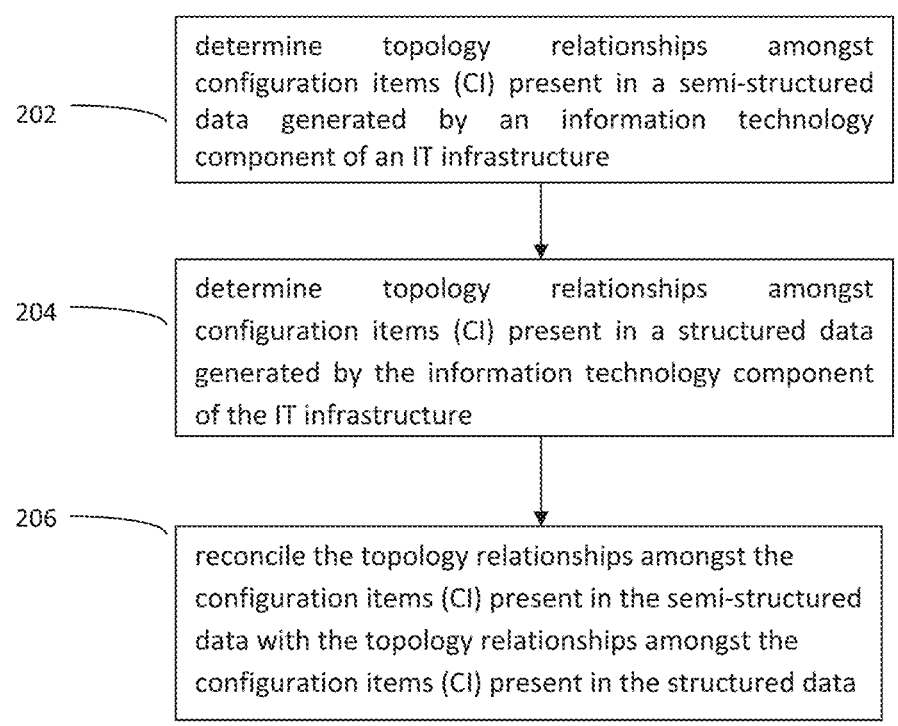
FIG. 2 illustrates a method of automatically discovering topology of an Information Technology (IT) infrastructure, according to an example.

FIG. 2 illustrates a method of automatically discovering topology of an Information Technology (IT) infrastructure, according to an example. At block 202, configuration items (CIs) in an Information Technology (IT) infrastructure are identified from the semi-structured data generated by various components present in the IT infrastructure. Such components could be hardware components, software components, network components, storage components, and/or other components. The semi-structured data generated by these components, which may include by way of non-limiting examples log files, events, configuration files, etc., is analyzed to identify the configuration items present therein. Upon identification of the configuration items, the topology relationships amongst the configuration items are determined from the semi-structured data.

In an implementation, the configuration items present in the semi-structured data and the topology relationships amongst the configuration items is determined by parsing the semi-structured data. A natural language parser or a lexical analyzer may be used for this purpose which results into creation of tokens from the sequence of input characters (in this case, the semi-structured data). A token is a string of one or more characters that is considered significant as a group. Tokens are typically identified based and categorized by character content or by context within the data stream depending on the rules of the lexical analyzer. For example, written languages commonly categorize tokens as nouns, verbs, adjectives, or punctuation. Thus, a natural language parser works out the grammatical structure of sentences, for instance, which groups of words are noun phrases, verb phrases, adjective phrases, and so forth.

In an example, the natural language processor is used to identify nouns from the tokens. Pronouns (for instance, in the same sentence with nouns) may also be used to identify the nouns present in the semi-structured data. To provide an example: the sentence, "Cluster HP-SW-CL1 is unreachable. Please check all LAN associated with cluster" in the semi-structured data, identifies that the noun "HP-SW-CL1".

The identified nouns are used to populate an ontology-based database. In an implementation, the ontology is based on OWL 2 Web Ontology Language (OWL) by W3C. OWL and OWL2 are used to refer to the 2004 and 2009 specifications of the Web Ontology Language, respectively. OWL 2 is declarative language that describes a state of affairs in a logical way. Appropriate tools (i.e. reasoners) can then be used to infer further information about that state of affairs. OWL 2 ontology provides classes, properties, individuals, and data values for categorizing data. Similar to basic English grammar structure, OWL-2 supports basic notions as Axioms, Entities and Expressions. OWL-2 allows modeling of class hierarchies to define sub-class relationship, disjoint relationship, object property assertion and negation, property hierarchy, domain and range restriction. More details and the Structural Specification (and functional syntax) of OWL 2 Web Ontology Language may be obtained from the following web-links: http://www.w3.org/TR/2012/REC-owl2-syntax-20121211/ and http://www.w3.org/TR/owl2-primer/.

In an implementation, the identified nouns form the basic "classes" of the ontology and the database is seeded accordingly. If a noun is not already present in the database, a new entry is created. For instance, referring to the earlier example, if during parsing of the sentence, "Cluster HP-SW-CL1 is unreachable. Please check all LAN associated with cluster" in the semi-structured data, the term "HP-SW-CL1" is missing from the database; a new entry would be created to accommodate the latest information. In like manner, the nouns present in the semi-structured data could be used to identify the domain specific "classes" (in other words, the configuration items) such as Host, Cluster, Database, Network LAN, Business Application etc. These classes are used as building blocks for constructing the ontology.

Similarly, the adjectives present in the tokens describing nouns are analyzed to populate the database with an attribute(s) (or property) of a class (i.e. a configuration item). To provide an example, The sentences "HW-Host-1 is not responding", "HW-Host-1 is unreachable" or "HW-Host-1 is down" could tie HW-Host-1 to object property "Not-Working" which contains "not responding", "unreachable", "down" as subclasses of "Not Working". In the context of OWL 2 ontology, an adjective may define an object property assertion. For example: ObjectPropertyAssertion(:hasIPAddress :Host :16.243.33.23) // indicates that token host has a property IP address with value 16.243.33.23.

In the like manner, conditional tokens maybe analyzed to determine relationship between a set of tokens. For instance, conditional operators such as "not" and "and" can be used to determine inclusion or exclusion relationship between configuration items. For example: "HW-Host-1 is not connected to LAN-1" could indicate that "HW-Host-1" can be part of disjoint class "LAN-1".

Tokens may also be analyzed for any other special regular expression syntaxes that a user may like to discover. For example, a user may want to identify all tokens starting with "HP" and ending with "1111" as a host. In such case, a token "HP-WR-988883-1111" would be identified accordingly.

In this manner, each line in the semi-structured data could be parsed to identify classes, sub-classes, model class hierarchies, define sub-class relationship, object property assertion, property hierarchy, and so forth, as per the ontology used to create and populate the database. With each line parsed, the database gets populated and updated, as required, with class hierarchy and properties of the classes and sub-classes. In an implementation, each entry in the database is timestamped thereby allowing, for instance, the discovery of a change in relationship between configuration items in a time-based format. Some non-limiting examples of OWL 2 ontology-based database class expressions are given below.

ClassAssertion(:Cluster :Cluster-1-DB) // may indicate a class assertion that token identified as 'Cluster-1-DB' is stored as an identified Cluster.

SubClassOf(:Cluster :Hardware) // may indicate that class 'Cluster' is identified as a subclass of class Hardware which in turn makes 'Cluster-1-DB' an hardware component.

SubClassOf(:Host :Cluster) // may indicate that 'Host is identified as a subclass of class Cluster.

DisjointClasses(:Cluster :Application ) // may indicate that two classes Cluster and Application are disjoint classes with no relationship.

ClassAssertion(:Application :"CRM") // may indicates that there is a token "CRM" identified as "CRM" whose hierarchy excluded from hierarchy of cluster.

ObjectPropertyAssertion(:hasIPAddress :Host :16.243.33.23) // may indicate that token host has a property IP address with value 16.243.33.23.

In this manner, the topology relationships amongst configuration items (CIs) present in the semi-structured data are determined.

At block 204, configuration items (CIs) in an Information Technology (IT) infrastructure are identified from the structured data generated by various components present in the IT infrastructure. The structured data generated by these components, which may include by way of non-limiting examples various types of metrics (such as performance metrics, availability metrics, etc.), is analyzed to identify the configuration items present therein. Upon identification of the configuration items, the topology relationships amongst the configuration items are determined from the structured data.

In an implementation, the configuration items present in the structured data and the topology relationships amongst the configuration items is determined by creating a pre-defined database of metrics for different categories of information technology components (for example, host computers, Central Processing Units (CPUs), applications, memory, storage, etc.). For example, a number of metrics may be defined for an Oracle database. Also, a number of tools may be used to collect the pre-defined metrics. Pre-defined metrics for each category of information technology component is stored in the pre-defined database. The pre-defined database would identify the metrics needed to be queried in different tools to identify a configuration item and its related configuration items. For example, in case of an Oracle database metric collection from a tool, an entry in the pre-defined database may suggest to look at HOST_NAME and INSTANCE_NAME metrics to identify the computer system where an Oracle instance is running and the name of the Oracle instance. This would help determine the relationship between the two entities.

In another implementation, the configuration items present in the structured data and the topology relationships amongst the configuration items is determined by analyzing the structure data using a natural language parser as described earlier in relation to semi-structured data at block 202.

By either or both above described procedures, the topology relationships amongst configuration items (CIs) present in the structured data are determined. In an implementation, such topology information is used to regularly update the ontology-based database that stores the topology relationships amongst configuration items (CIs) present in the semi-structured data.

At block 206, the topology relationships identified between the configuration items (CI) present in the semi-structured data are reconciled with the topology relationships identified between the configuration items (CI) present in the structured data. In this manner, the differences between the topologies are reconciled to determine a more definite and conclusive topology among configuration items. Thus, in an implementation, the ontology-based database includes an inventory of all CIs and their relationship with other CIs over a period of time.

In an example, the accuracy of configuration items discovered via analysis of semi-structured and structured data may be determined by various methods. For example, a configuration item of type Host or Network device discovered from parsing of semi-structured data may be validated by executing a ping command on it. Similarly, for a Web server may be validated by executing a HTTP request. Thus different mechanisms could be used to validate the accuracy of the CIs discovered by the automated process.

In an implementation, a Graphical User interface (GUI) may be used to display the two topologies obtained from the analysis of semi-structured and structured data. The GUI may also be used to display the reconciled or final topology.

Figure 3:
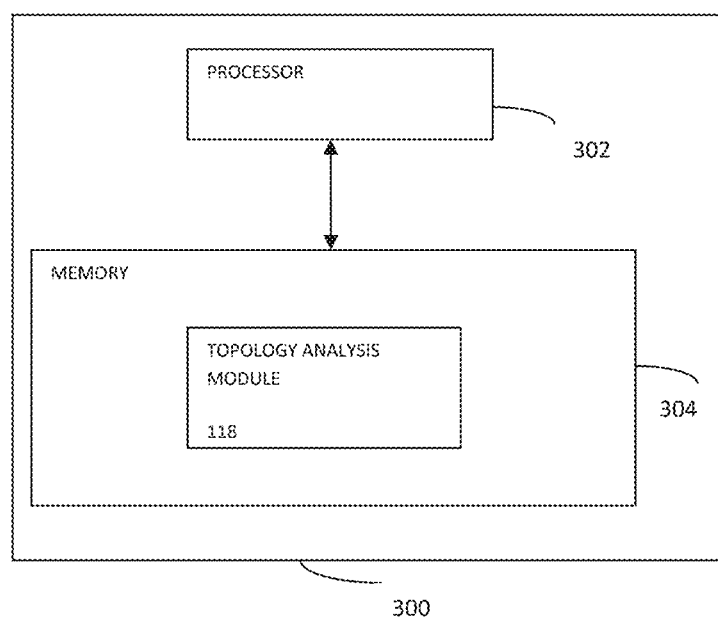
FIG. 3 illustrates a system for automatically discovering topology of an Information Technology (IT) infrastructure, according to an example.

FIG. 3 illustrates a system for automatically discovering topology of an Information Technology (IT) infrastructure, according to an example. System 300 includes a processor 302 that executes instructions in a memory 304. The memory 304 includes topology analysis module 118 to: determine topology relationships amongst configuration items (CI) present in a semi-structured data generated by an information technology component of the IT infrastructure, determine topology relationships amongst configuration items (CI) present in a structured data generated by the information technology component of the IT infrastructure, and reconcile the topology relationships amongst the configuration items (CI) present in the semi-structured data with the topology relationships amongst the configuration items (CI) present in the structured data.

The proposed solution helps discovers useful topology information from semi-structured and structured data automatically which could otherwise be a manual process. It helps an IT personnel easily diagnose issues related to an information technology component and provides context to a user while troubleshooting a problem thereby bringing down the MTTR.

For the purpose of simplicity of explanation, the example method of FIG. 2 is shown as executing serially, however it is to be understood and appreciated that the present and other examples are not limited by the illustrated order. The example systems of FIGS. 1 and 3, and method of FIG. 2 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and be executed by a processor.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method comprising:
automatically determining, by a computer, based on first configuration items (CI) present in a semi-structured data generated by an information technology component of an IT infrastructure, first topology relationships amongst the first configuration items (CI);
automatically determining, by the computer, based on second configuration items (CI) present in a structured data generated by the information technology component, second topology relationships amongst the second configuration items (CI), wherein the determination of the second topology relationships comprises accessing a database storing metrics for the second configuration items (CI) and determining the second topology relationships based on the stored metrics;
reconciling, by the computer, the first topology relationships with the second topology relationships to provide an ontology of third configuration items (CI) of the IT infrastructure; and
providing data to display, in a graphical user interface (GUI), the ontology of the third configuration items (CI).

2. The method of claim 1, further comprising identifying the first configuration items (CI), wherein the first configuration items (CI) are identified from nouns and pronouns present in the semi-structured data.

3. The method of claim 1, wherein the automatic determination of the first topology relationships amongst the first configuration items (CI) comprises:
parsing the semi-structured data to create tokens; and
analyzing nouns and/or pronouns present in the tokens to identify the first configurations items (CI).

4. The method of claim 3, further comprising analyzing adjectives present in the tokens to determine one or multiple properties of the first configuration items (CI).

5. The method of claim 3, further comprising analyzing conditional phrases between the tokens to determine topology relationships amongst the first configuration items (CI).

6. The method of claim 3, further comprising analyzing the tokens against a user-defined syntax.

7. The method of claim 1, further comprising populating the ontology of the third configuration items (CI) with one or multiple properties of the third configuration items (CI), and topology relationships amongst the third configuration items (CI).

8. The method of claim 1, further comprising updating the ontology of the third configuration items (CI) periodically.

9. The method of claim 8, wherein the updating generates updated entries, the method further comprising time stamping each updated entry of the updated entries.

10. The method of claim 1, wherein the metrics comprise at least one of performance metrics or availability metrics.

11. A system, comprising:
a processor; and
a memory to store instructions that, when executed by the processor, cause the processor to:
determine, based on first configuration items (CI) present in a semi-structured data generated by an information technology component of an IT infrastructure, first topology relationships amongst the first configuration items (CI);
determine, based on second configuration items (CI) present in a structured data generated by the information technology component, second topology relationships amongst the second configuration items (CI), wherein the determination of the second topology relationships amongst the second configuration items (CI) comprises accessing a database storing metrics for the second configuration items (CI) and determining the second topology relationships based on the stored metrics;
reconcile the first topology relationships with the second topology relationships to generate an ontology of third configuration items (CI) of the IT infrastructure; and
provide data to display, in a graphical user interface (GUI), the ontology of the third configuration items (CI).

12. The system of claim 11, wherein the semi-structured data includes one of a log file, an event or a configuration file.

13. The system of claim 11, further comprising a database for storing the ontology of the third configuration items (CI).

14. A non-transitory processor readable storage medium, storing machine executable instructions that, when executed by a processor, cause the processor to:
determine, based on first configuration items (CI) present in a semi-structured data generated by an information technology component of an IT infrastructure, first topology relationships amongst the first configuration items (CI);
determine, based on second configuration items (CI) present in a structured data generated by the information technology component, second topology relationships amongst the second configuration items (CI), wherein the determination of the second topology relationships amongst the second configuration items (CI) comprises accessing a database storing metrics for the second configuration items (CI) and determining the second topology relationships based on the stored metrics;
reconcile the first topology relationships with the second topology relationships to create an ontology of third configuration items (CI) of the IT infrastructure based on Web Ontology Language (OWL); and
provide data to display, in a graphical user interface (GUI), the ontology of the third configuration items (CI).

15. The method of claim 1, wherein the determination of the first topology relationships amongst the first configuration items (CI) comprises determining topology relationships based on configuration items (CI) present in at least one of a log file, an event, or a configuration file.

16. The method of claim 1, wherein the determination of the second topology relationships amongst the first configuration items (CI) comprises determining topology relationships based on configuration items (CI) present in at least one of a performance metric or an availability metric.

17. The method of claim 1, wherein the reconciliation of the first topology relationships with the second topology relationships comprises determining an accuracy of a configuration item (CI) of the first configuration items (CI) or a configuration item (CI) of the second configuration items (CI).

18. The method of claim 17, wherein the determination of the accuracy of a configuration item (CI) of the first configuration items (CI) or a configuration item (CI) of the second configuration items (CI) comprises pinging a host or a network device.

19. The method of claim 17, wherein the determination of the accuracy of a configuration item (CI) of the first configuration items (CI) or a configuration item (CI) of the second configuration items (CI) comprises executing a request to a server.

* * * * *